UNITED STATES PATENT OFFICE.

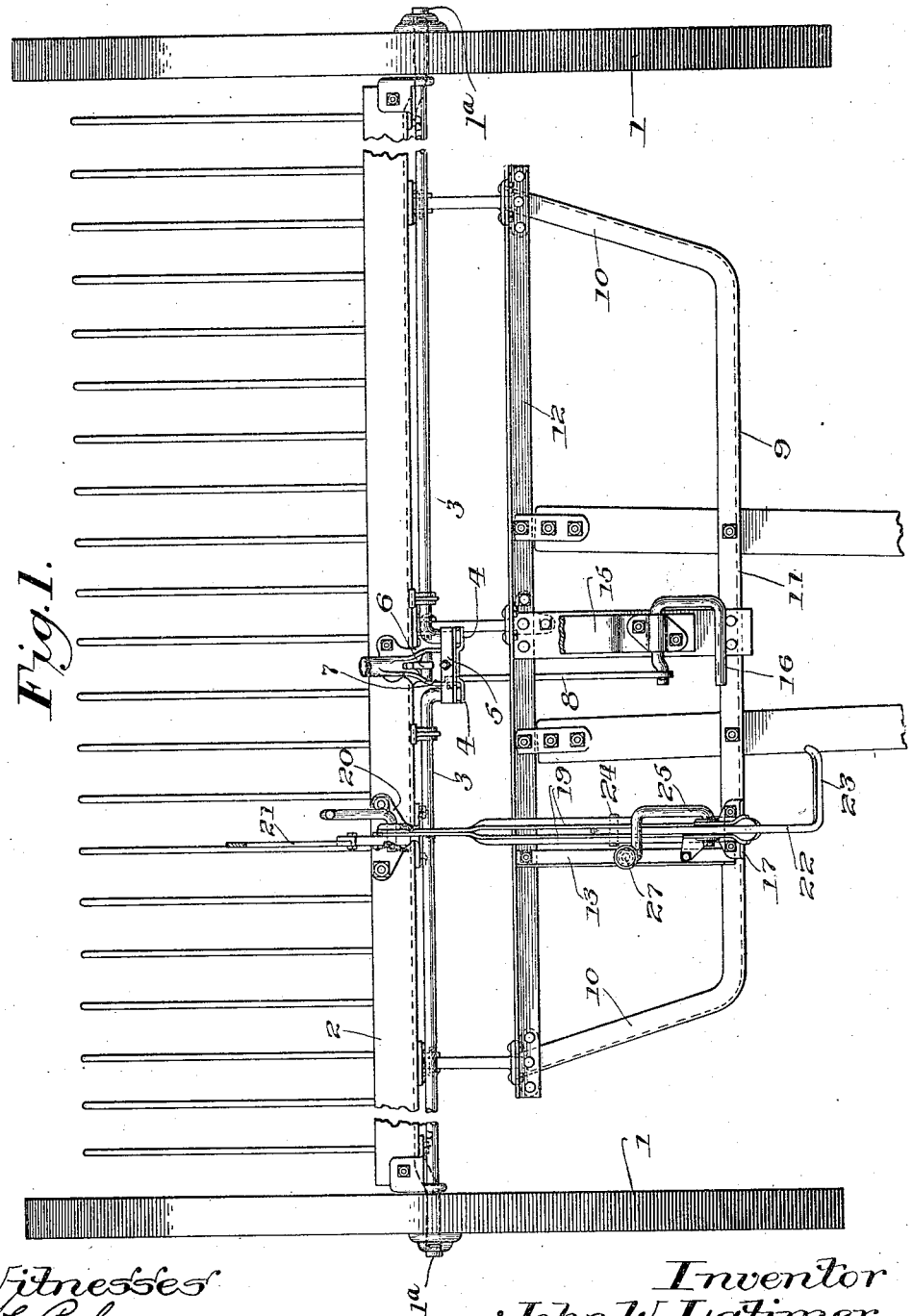

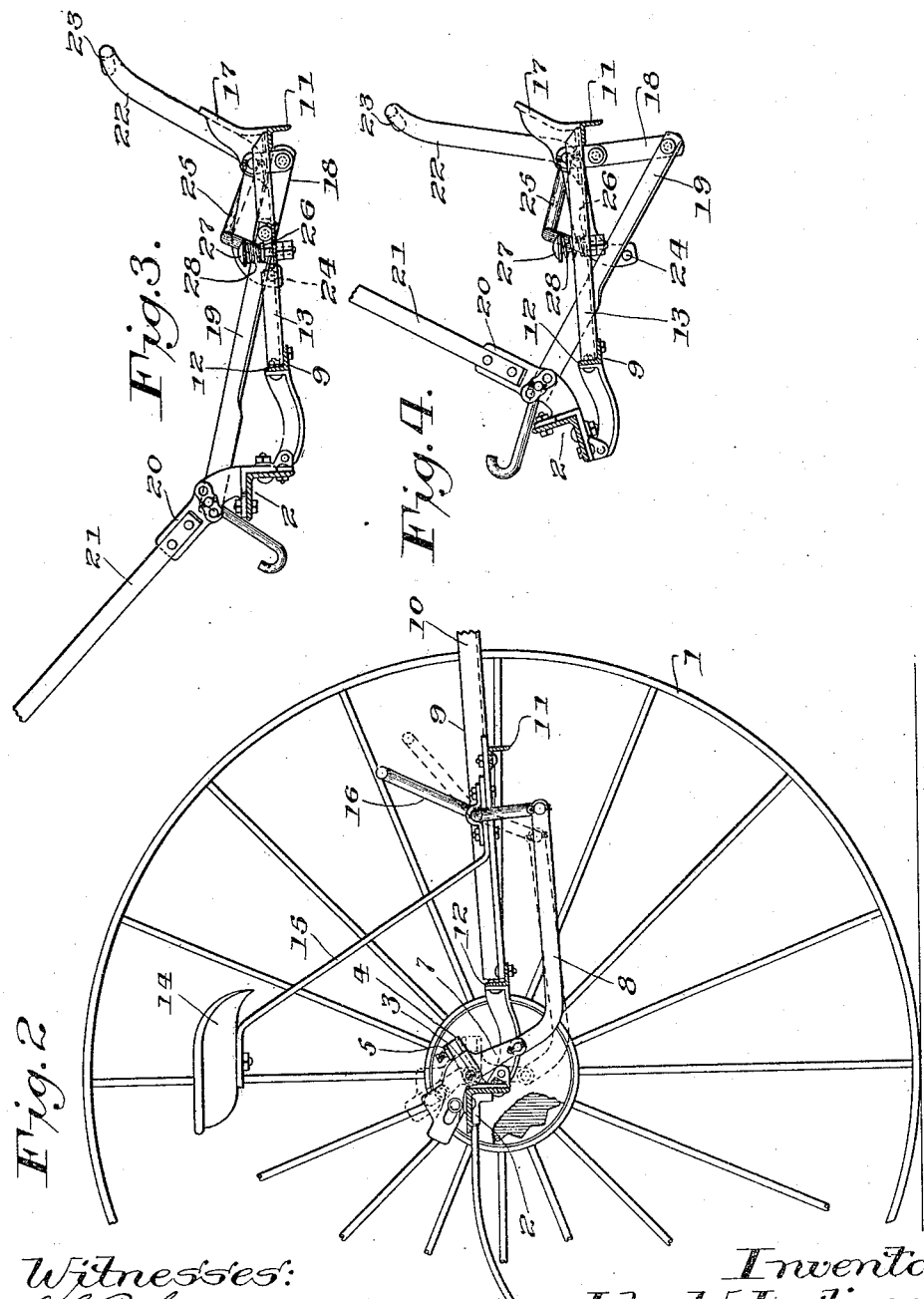

JOHN W. LATIMER, OF CHICAGO, ILLINOIS, ASSIGNOR TO INTERNATIONAL HARVESTER COMPANY OF NEW JERSEY, A CORPORATION OF NEW JERSEY.

HAY-RAKE.

1,204,460.   Specification of Letters Patent.   Patented Nov. 14, 1916.

Application filed April 1, 1914. Serial No. 828,778.

*To all whom it may concern:*

Be it known that I, JOHN W. LATIMER, a citizen of the United States, residing at Chicago, in the county of Cook and State of Illinois, have invented certain new and useful Improvements in Hay-Rakes, of which the following is a full, clear, and exact specification.

My invention relates to hay rakes.

It has for its object to improve the construction and operation of the same.

A further object of my invention is to improve the toggle connections between the draft frame and the rocking tooth carrying head, whereby a slight pressure by the operator upon one of the toggle controlling members will positively lock the head against a premature movement in a direction to dump the load, and when such pressure is relieved the toggle mechanism is automatically thrown to an unlocked position, permitting the clutch mechanism to be tripped into action and the rake head to turn in a direction to dump the load.

These objects are attained by means of mechanism, one embodiment of which is illustrated in the accompanying drawing, in which—

Figure 1 is a plan view of a rake equipped with my improvement; Fig. 2 is a sectional end elevation of part of a hay rake having my invention embodied in its construction; Fig. 3 is a detached side elevation of the toggle mechanism connecting the draft frame with the rocking rake head; Fig. 4 is a similar view showing the position of the toggle mechanism as the load is dumped.

Referring to the drawings, wherein the same reference characters designate like parts throughout the several views, 1 represents the traction and carrying wheels, 2 a rocking tooth carrying head mounted upon the wheel spindles 1ª and adapted to be clutched into engagement with the traction wheels in a manner to turn it about their axis in a direction to dump a load in a separate common way, 3 a common form of divided rock shaft journaled in bearings carried by the head, and having laterally turned arms at its middle that are received by socket members formed on a radially extending arm 4, a single upper spring-pressed plate 5 attached at its center to the arm 4 normally holding the ends of the rods in the position shown in Figs. 1 and 2. The arm 4 also frictionally coacts with a sector 6 in a manner to yieldingly retain the rock shaft in either of its positions as a clutch controlling member, and 7 a downwardly extending arm having the rear upturned end of a clutch controlling link 8 pivotally connected therewith.

9 represents the draft frame, pivotally connected with the head, and including side members 10.

11 and 12 represent front and rear transverse members, and 13 a cross tie member connecting the members 11 and 12 near their middle, 14 the operator's seat carried by a spring member 15 secured to the draft frame, 16 a clutch tripping lever journaled upon the seat spring, having its upper end turned laterally to form a convenient part to receive the operator's foot, and its lower end pivotally connected with the front end of the link 8, whereby a forward movement of the upper end of the lever 16 will ship the clutch mechanism into action.

The toggle link connection between the draft frame and the tooth carrying head includes a bracket member 17 secured to the front side of the draft frame, and having pivotally connected therewith the front end of a toggle bar 18, the rear end of the bar being received between the front ends of a pair of toggle bars 19, and pivotally connected therewith, the rear ends of the bars 19 being pivotally connected with a bracket member 20 secured to the rake head and carrying a dump lever 21.

22 represents a toggle controlling foot lever pivoted intermediate its ends upon the bracket 17 secured to the draft frame and in a manner permitting it to swing in a vertical plane, having its upper end turned laterally, forming a stirrup member 23 for the foot of the operator, and its opposite end extending rearward and curved downward between the bars 19 and carrying a transverse pin 24 that engages with the lower sides of the bars 19.

When the teeth carried by the head are in raking position upon the ground the toggle mechanism is in the position shown in Fig. 3, wherein, when pressure is applied to the foot lever 22, the axis of the pivotal connection between the bars 19 and the bar 18 is carried slightly above a line drawn through the axis of the opposite end of the bar 18 upon the bracket 17, and the axis of the rear ends of the bars 19 upon the bracket 20 by means of the transverse pin 24, thereby locking the rake head in an operative position.

Means are provided that are operative to break the lock of the toggle mechanism, including a vertical swinging member 25 disposed above the toggle bars, having its front end turned laterally and forming a pivotal connection between the foot lever 22 and the bracket 17, and extending rearward is turned laterally above and across the foot lever and rests thereon, and then downward and provided with an ear member 26, having an opening therein that receives a bolt 27, secured to the cross tie member 13 of the draft frame. Encircling the bolt 27, and above the ear 26, is a compression spring 28, operative between the head of the bolt and the ear to yieldingly swing the member 25 downward when the pressure is released from the foot lever 22, and it carries with it the foot lever, that engages with the upper side of the rear end of the toggle bar 18 in a manner to swing the toggle members downward from their locking position, and the rake head is free to rock forward when the operator presses forward upon the clutch tripping lever 16 to cause the clutch members to engage.

In operation, with the rake teeth upon the ground and the rake head turned rearward, it is automatically locked in that position by the toggle connection between the head and draft frame as controlled by the operator pressing forward upon the foot lever 22, and when a load has been accumulated the operator relieves the pressure and the toggle lock is broken by the spring 28, and the clutch mechanism may then be thrown into action to dump the accumulated load.

Having shown and described an embodiment of my invention, I do not wish to have it confined to the details of construction as illustrated, it being understood that many changes may be made in the details without departing from the spirit of my invention.

What I claim as my invention and desire to secure by Letters Patent is:

1. In a hay rake, a draft frame, a rocking tooth-carrying head pivoted thereto, a locking member associated with said frame operatively connected to and for locking said head, and means also associated with said frame for releasing said head, said means forming a pivot for said locking member.

2. In a hay rake, a draft frame, a rocking tooth-carrying head pivoted thereto, and associated commonly pivoted locking and lock-breaking members operatively connected to said head and frame.

3. In a hay rake, a draft frame, a rocking tooth carrying head pivotally connected with said draft frame, means for rocking said head in a direction to dump a load, means for securing said head in a raking position comprising toggle mechanism, said mechanism including a toggle bar having its front end pivotally connected with said draft frame, a toggle member having its rear end pivotally connected with said head and its front end pivotally connected with the rear end of said toggle bar, a foot lever pivotally mounted upon said draft frame and having a rearwardly extending arm engaging with the lower side of said toggle member in a manner to move said mechanism to a self-locking position when pressure is applied to said foot lever, a lock breaking member having one end pivotally connected with said draft frame, said member engaging with the upper side of said arm, and a spring carried by said draft frame and operative to move said lock breaking member and said arm in a direction to unlock said toggle mechanism when said foot lever is released from pressure.

4. In a hay rake, a draft frame, a rocking tooth carrying head pivotally connected with said draft frame, means for rocking said head in a direction to dump a load, means for securing said head in a raking position comprising toggle mechanism, said mechanism including a toggle bar having its front end pivotally connected with said draft frame, a toggle member having its rear end pivotally connected with said head and its front end pivotally connected with the rear end of said toggle bar, a foot lever pivotally mounted upon said draft frame and having a rearwardly extending arm engaging with the lower side of said toggle bar when the toggle mechanism is in a self-locking position, a lock breaking member having one end pivotally connected with said draft frame coaxially with said foot lever, having its body extending rearward and turned laterally above and engaging with said arm and then downward and having an ear upon its opposite end, and a compression spring carried by said draft frame and engaging with the ear in a manner to move said lock breaking member and said arm in a direction to unlock said toggle mechanism when said foot lever is released from pressure.

In testimony whereof I affix my signature, in the presence of two witnesses.

JOHN W. LATIMER.

Witnesses:
 J. W. LUNDQUIST,
 CHARLES H. BURNS.

Copies of this patent may be obtained for five cents each, by addressing the "Commissioner of Patents, Washington, D. C."